(12) United States Patent
Huber et al.

(10) Patent No.: US 6,513,419 B2
(45) Date of Patent: *Feb. 4, 2003

(54) COFFEE MACHINE

(75) Inventors: Siegfried Huber, Kuchen; Günther Nagel, Donzdorf, both of (DE)

(73) Assignee: WMF Wurttembergische Metallwarenfabrik AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,548

(22) Filed: Dec. 1, 1999

(65) Prior Publication Data

US 2001/0042444 A1 Nov. 22, 2001

(30) Foreign Application Priority Data

Dec. 31, 1998 (EP) .............................. 98124888

(51) Int. Cl.⁷ .............................. A47J 31/44; A47J 31/06
(52) U.S. Cl. .............................. 99/315; 99/312; 99/314; 99/305; 99/306; 426/433
(58) Field of Search .................... 99/315, 314, 312, 99/311, 310, 306, 305

(56) References Cited

U.S. PATENT DOCUMENTS

| | | | | |
|---|---|---|---|---|
| 2,948,618 A | * | 8/1960 | Saint | 99/306 X |
| 5,340,597 A | * | 8/1994 | Gilbert | 99/280 X |
| 5,434,392 A | * | 7/1995 | Belinkoff | 99/302 R X |
| 5,477,775 A | * | 12/1995 | Delhom et al. | 99/305 X |

FOREIGN PATENT DOCUMENTS

| | | |
|---|---|---|
| BE | 887805 | 7/1981 |
| DE | 3316157 A1 | 11/1984 |
| DE | 9318177 | 1/1994 |
| DE | 3829417 C2 | 8/1996 |
| EP | 0324446 A1 | 7/1989 |
| EP | 0443054 B1 | 11/1994 |
| FR | 2634365 A1 | 1/1990 |
| JP | 48-57763 | 8/1973 |
| JP | 56-001123 | 1/1981 |
| JP | 3-158116 | 7/1991 |
| JP | 3022517 | 12/1995 |
| JP | 9-192021 | 7/1997 |
| JP | 2000-139717 | 5/2000 |
| NL | 7703422 | 10/1978 |
| WO | WO 9324041 | 12/1993 |
| WO | WO96/10355 | 4/1996 |

* cited by examiner

Primary Examiner—Reginald L. Alexander
(74) Attorney, Agent, or Firm—Susan D. Betcher; Seed IP Law Group PLLC (57) ABSTRACT

Described is a coffee machine (1) comprising a brewing member (5, 5'), a support surface (15) for ground coffee and a member (3, 6, 7) for applying water to the ground coffee, in which it is possible to level off the ground coffee positioned on the support surface (15) in a constructionally simple and generally applicable manner to obtain a layer having a substantially uniform thickness. To this end there is provided a member (22, 24, 25, 122, 222, 322) which guides water in a purposefully non-uniform manner over the ground coffee such that the ground coffee is distributed over the support surface (15) in a layer having a substantially uniform thickness.

13 Claims, 6 Drawing Sheets

COFFEE MACHINE

TECHNICAL FIELD

The present invention relates to a coffee machine and to a method of operating the same.

BACKGROUND OF THE INVENTION

Coffee machines are largely known. An example of such a coffee machine is described in EP-B1-443-054. The known coffee machine contains a brewing means in the form of a piston-cylinder unit, with the cross section of the brewing cylinder being closed by a brewing strainer arranged on the piston and with the upwardly oriented front side being closed by a water distributing sieve. The water distributing sieve is to ensure that the water will uniformly wet the entire cross-section of the brewing chamber, and the sieve is therefore provided with a great number of equally sized flow openings which are uniformly distributed over the entire area. During operation the ground coffee required is heaped in the removed state of the distributing sieve from a place above the brewing means onto the brewing strainer. In the attempt not to spill any ground coffee, the formation of a heaped cone is inevitably accepted. After the ground coffee has been introduced in metered amounts, the distributing sieve is again brought into its closing position and supplied with water which is uniformly distributed above the distributing sieve and then drips onto the ground coffee in a uniformly distributed manner over the entire surface of the distributing sieve. Although the heaped cone may be somewhat leveled off by floating ground coffee, such a leveling process can at best be observed at the end of the brewing operation.

It is a known fact among the experts that for an optimum exploitation of the ground coffee the latter should, if possible, be present in a layer of uniform thickness.

However, known possibilities of achieving such a layer require efforts so great, or are not suited for all types of coffee machines, that instead of the use of such constructions the disadvantages of a heaped cone have rather been accepted. For instance, DE-C2-38 29 417 shows a household coffee machine with an overhead filter chamber and a kind of lid whose bottom side has provided thereon projecting ribs. After the ground coffee has been filled in, said lid is installed and manually rotated whereby the ground coffee is leveled off by the ribs.

In the coffee machine according to DE-A1-33 16 157, water distributing sieve and brewing strainer are arranged in ring-like configuration and the plunger is provided with an upwardly projecting longitudinal section terminating in a cone tip by which the filling opening for ground coffee can be closed. Whenever ground coffee is to be supplied in metered amounts, the plunger is moved slightly downwards and the ground coffee is portioned onto the cone tip of the longitudinal section so that said cone tip acts as a distributing means for a desired ring-like distribution of the ground coffee. Said construction, however, cannot be used in all types of coffee machines and can also not ensure a uniform layer thickness in radial direction.

SUMMARY OF THE INVENTION

It is thus the object of the present invention to provide a coffee machine and a method of operating the same, in which it is possible to level off the ground coffee with constructionally very simple means for obtaining a layer of a substantially uniform thickness.

In an embodiment of the present invention, the ground coffee is leveled off by non-uniformly introduced water prior to or at the beginning of the brewing operation—a measure which is universally applicable in all types of coffee machines as water has to be introduced into every brewing means of a coffee machine, and which, on the other hand, can be realized in a constructionally very simple manner. Depending on the special type and/or the position and constructional design of the ground-coffee metering means, the water can be directed by the means of the invention in such a purposeful manner onto the place of the initially greatest thickness of the ground coffee, i.e. the tip of the heaped cone, that the cone is leveled off. A further great advantage of the development according to the invention follows from the fact that the ground coffee can thereby be distributed in a uniform manner at any rate, irrespective of the size of the respectively metered amounts of ground coffee.

Using traditional equipment, the range of the amounts of coffee which could be brewed with a single size of a brewing chamber, i.e. with one and the same diameter of the support surface, has been limited. It had to be ensured that the metered amount of ground coffee was at least so great that the heaped cone thereof substantially covered the whole support surface, i.e. the brewing strainer. If the amount was too small, an area of the brewing strainer around the heaped cone was exposed so that water could directly pass therethrough, which considerably impaired the quality of the finished coffee beverage.

By contrast, in a coffee machine equipped with the means according to the invention, it is ensured that even a small amount of ground coffee can be distributed over the whole support surface and that as a consequence the brewing water is always bound to pass through the ground coffee before it can flow out of the brewing means. It is therefore possible to cover a considerably larger range of brewing batch sizes with one and the same brewing means, provided that it is equipped with the inventive means, without any loss in quality.

The non-uniform introduction of water can be achieved either by varying amounts or by different pressures of the introduced water.

In one embodiment, the invention incorporates a guiding means, such as a sieve, and an optimum distribution of the water which is respectively adapted to the specific type of the coffee machine and to the way how the ground coffee is metered can be achieved through an expedient design of the size and/or the distribution of the flow openings.

The desired, purposefully non-uniform distribution of the water can also be achieved by a plurality of water supply lines.

If a plurality of supply lines are combined with a sieve, the two areas of the sieve can be supplied with water in a predetermined sequence, resulting in the desired direction of flow.

If the water guiding means is configured in the manner of conventional water distributing sieves, already existing coffee machines can also be retrofitted with the means according to the invention.

BRIEF DESCRIPTION OF THE DRAWINGS

Embodiments of the invention will now be explained in more detail with reference to the drawings, in which.

DETAILED DESCRIPTION OF THE ILLUSTRATED EMBODIMENTS

Figure 1:
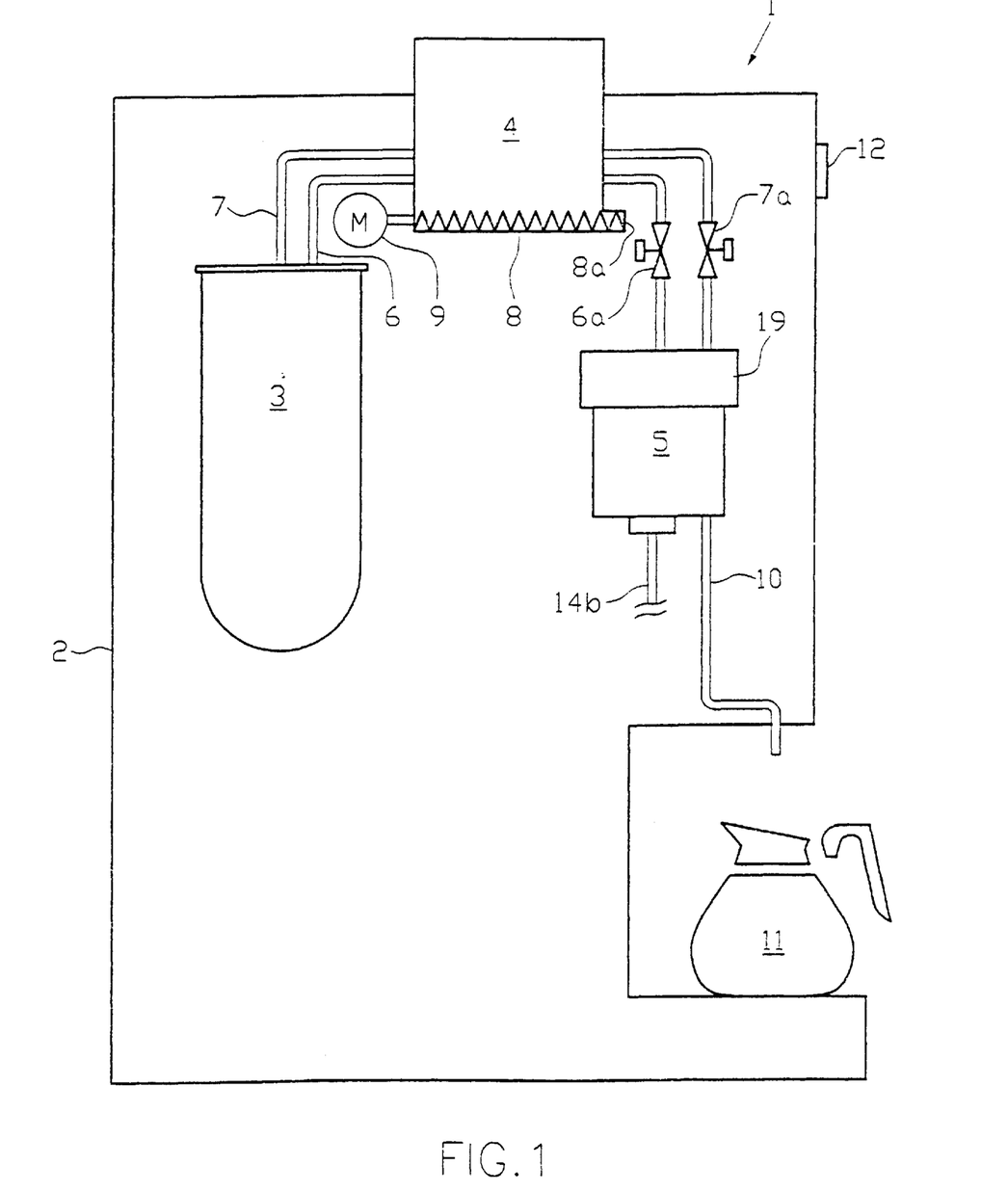
FIG. 1 is a schematic view showing a coffee machine according to one embodiment of the invention.

FIG. 1 is a schematic illustration showing the components of an automatically operating coffee machine 1. The coffee machine 1 comprises a housing 2 which accommodates a water heater 3, a raw coffee container 4 and a brewing means 5. The water heater 3 may either be a boiler or an instantaneous water heater and communicates with the brewing means 5 via two lines 6 and 7. Each of the lines 6, 7 has disposed therein a shut-off valve 6a and 7a, respectively, which is operable via a control unit that is standard in automatic coffee machines, but not shown here.

The raw coffee container 4 may be a ground coffee container or a container for coffee beans with an integrated grinding unit. The container 4 comprises a coffee metering means in the form of a standard metering screw 8 which is driven by a motor 9 which is also controlled by the control unit. The outlet 8a of the metering screw 8 is positioned above the brewing means 5 so that the ground coffee conveyed by the feed screw 8 drops into the brewing means 5. An outlet duct IO extends from the brewing means 5 out of the housing 2 in such a manner that a vessel (shown is a jug 11) which is positioned thereunder can be filled. Instead of the jug 11, however, any other conventional coffee pot may be filled either in addition or alternatively. Furthermore, standard operating means 12 in the form of push-buttons, knobs or control panels are provided on the housing 2.

Figure 2:
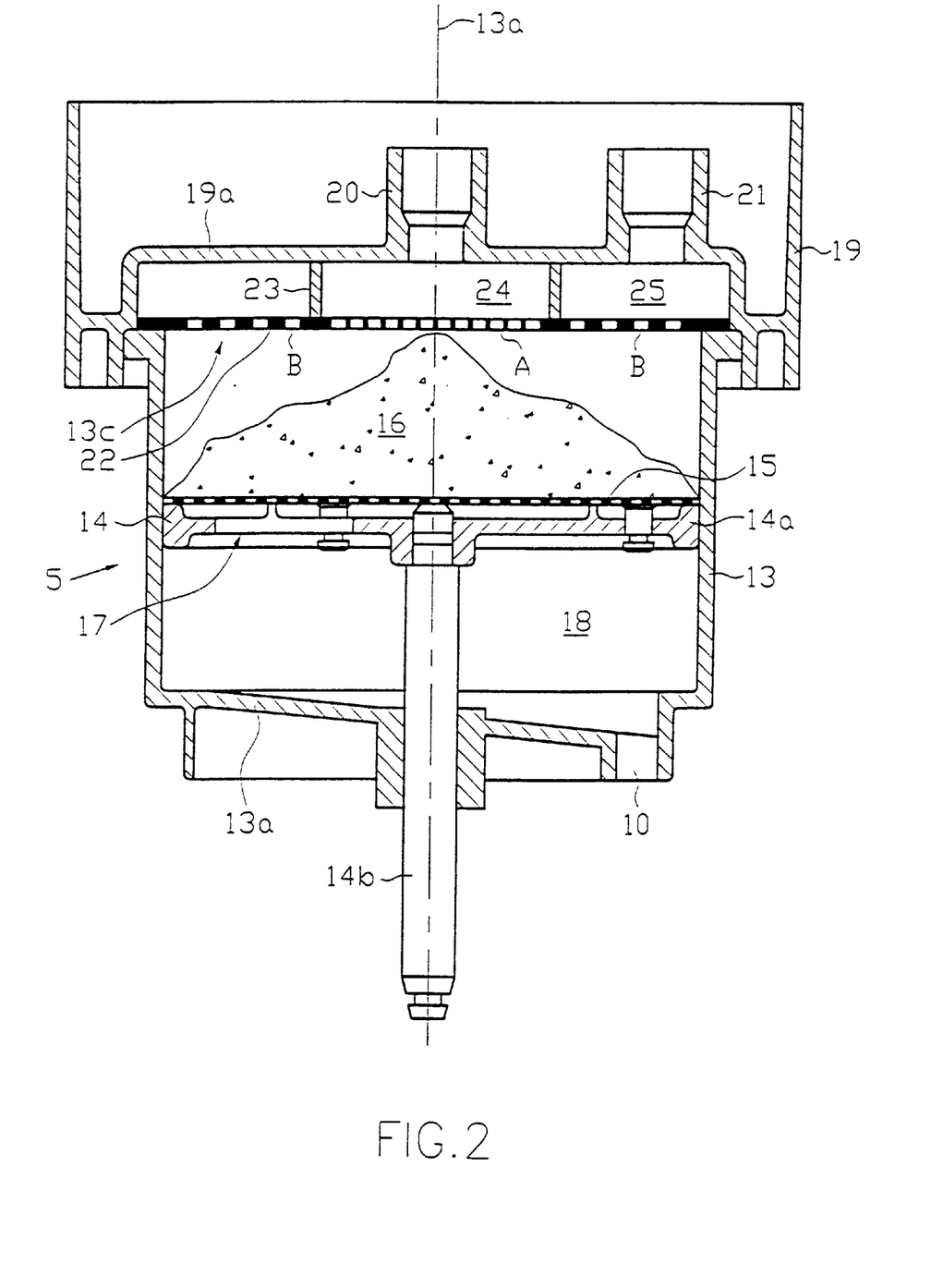
FIG. 2 is an enlarged view showing a brewing chamber of the coffee machine according to FIG. 1 with a heaped cone of ground coffee.
Figure 3:
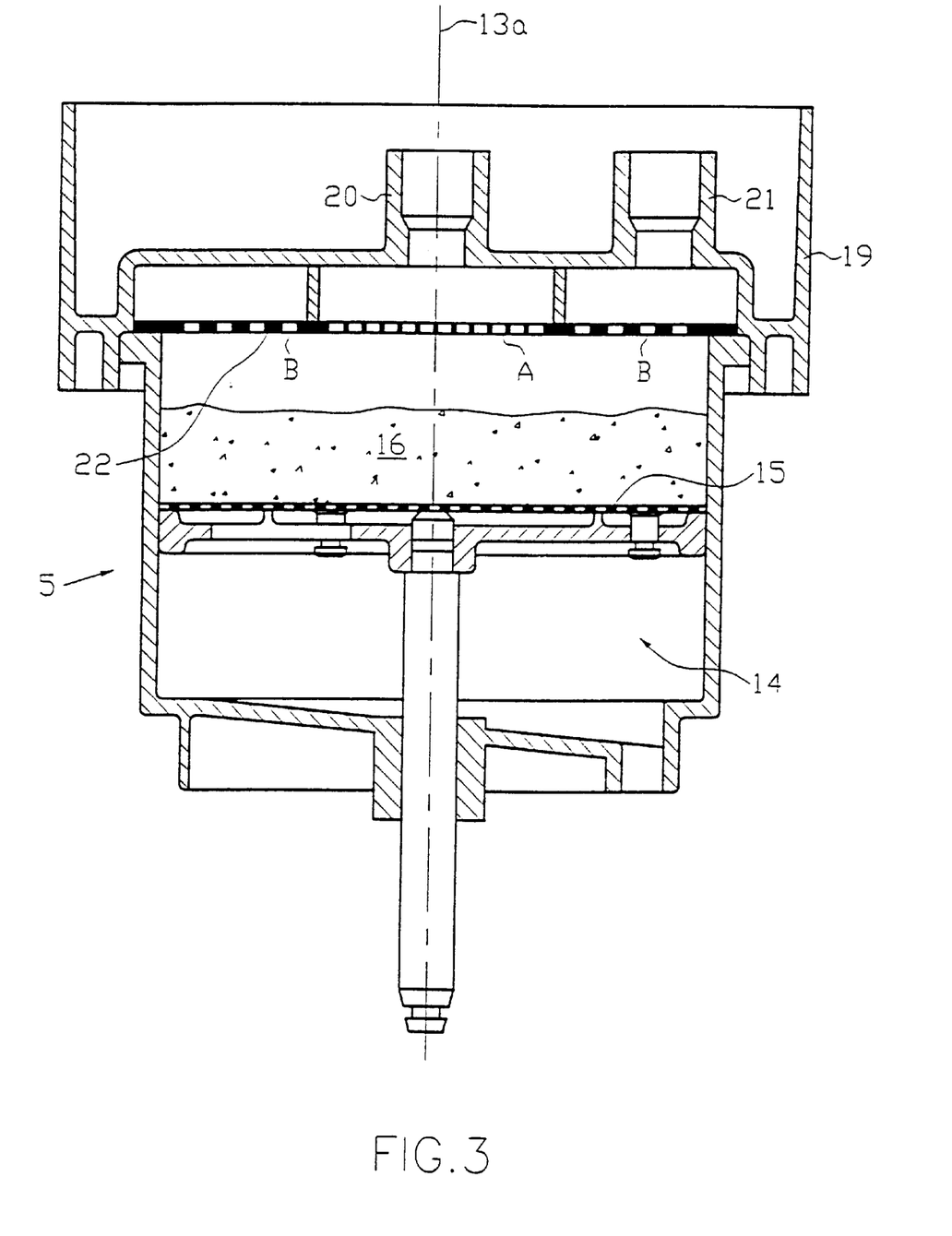
FIG. 3 shows the brewing chamber according to FIG. 2 after the ground coffee has been leveled off.
Figure 4:
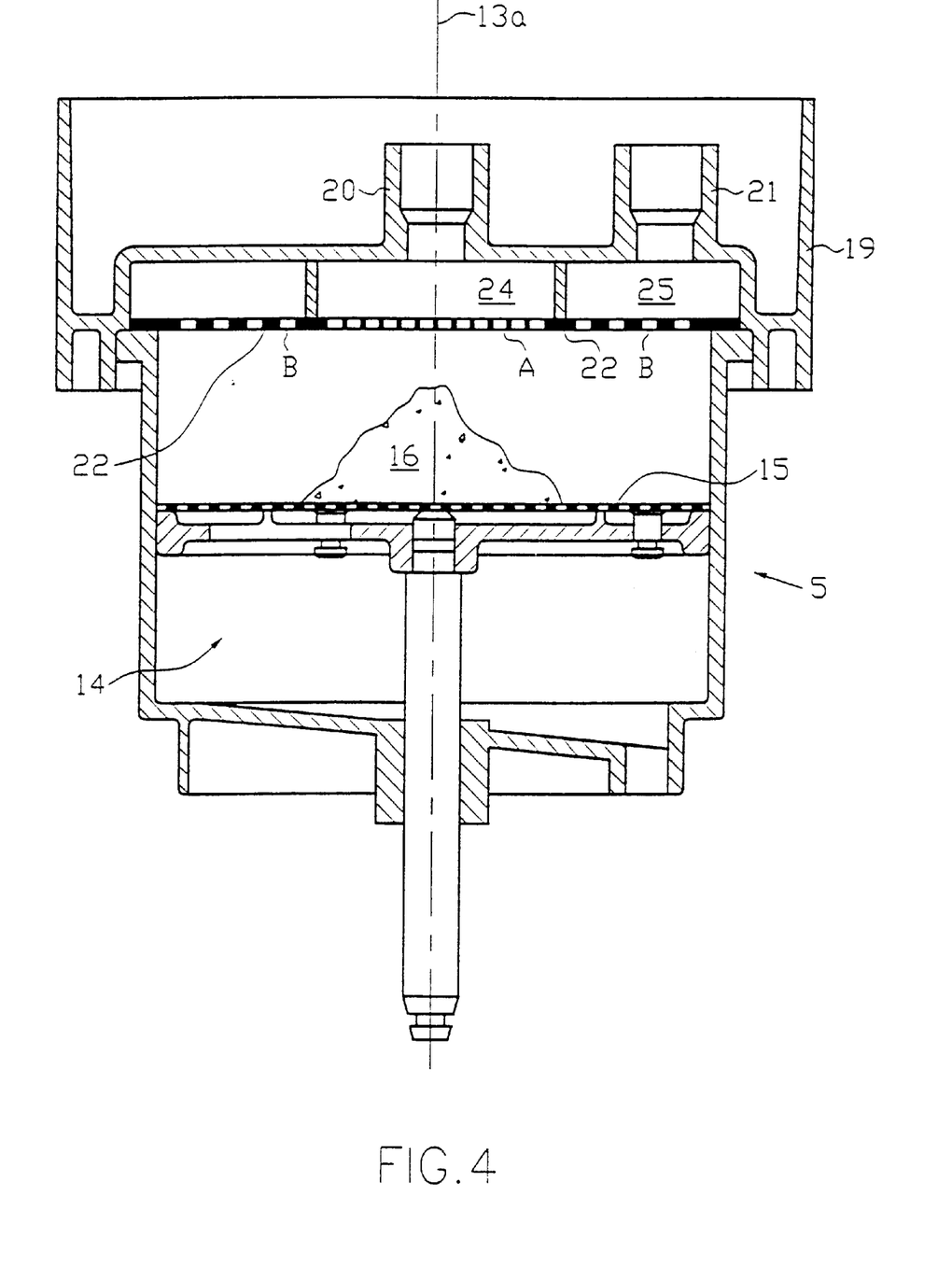
FIG. 4 shows the brewing chamber with a small amount of ground coffee within the heaped cone.

As can be seen in FIGS. 2 to 4, the brewing means 5 is a plunger-type brewing means and includes a substantially circular cylindrical housing 13 which is arranged with a vertically extending center line 13a and accommodates a plunger 14. The plunger 14 includes a disk-like plunger head 14a and a plunger rod 14b by which the plunger head 14a, driven by a motor (not shown), can be moved upwards or downwards along the center line 13a. The plunger head 14a fills the cross-section of the cylinder housing 13 substantially completely and sealingly slides along the wall of the cylinder housing 13. The upper side of the cylinder head 14a which faces away from the plunger rod 14b is covered with one of the standard brewing strainers 15 which forms a support surface for ground coffee 16. The brewing strainer 15 hollowly rests on the plunger head 14a, with the plunger head 14a comprising the standard collection chambers and guiding ducts, designated by 17 in their entirety, which enable the brewed beverage passing through the brewing strainer 15 to flow through the plunger head 14a and to pass into a chamber 18 which is formed between the plunger head 14a and a bottom 13a of the cylinder housing 13 and which the outlet duct 10 exits from.

At the front side of the cylinder housing 13 which is opposite to the bottom 13a, there is provided a filling opening 13c which preferably extends over the entire cross-section of the cylinder housing 13. This opening 13c is closed by a lid 19 which is movable by known means from its closing position shown in FIGS. 2 to 4 into a position in which it releases the filling opening 13c for filling the ground coffee 16 and for ejecting the used coffee grounds.

The lid 19 has a cover wall 19a through which a first connection 20 for the hot-water line 6 and a second connection 21 for the hot-water line 7 extend, at least the last longitudinal sections of the hot-water lines 6 and 7 being expediently designed as tubes to enable the lid 19 to move.

In parallel with and at a distance from the cover wall 19a and—at least in the closing position of the lid 19—in parallel with the brewing strainer 15, a water distributing sieve 22 is arranged in the lid 19. The space between the cover wall 19a and the water distributing sieve 22 is separated by a partition wall 23 into a first chamber 24 and a second chamber 25. The first chamber 24 is supplied with hot water by the first hot-water line 6 via the connection 20 and the second chamber 25 by the second hot-water line 7 via the connection 21.

Figure 5:
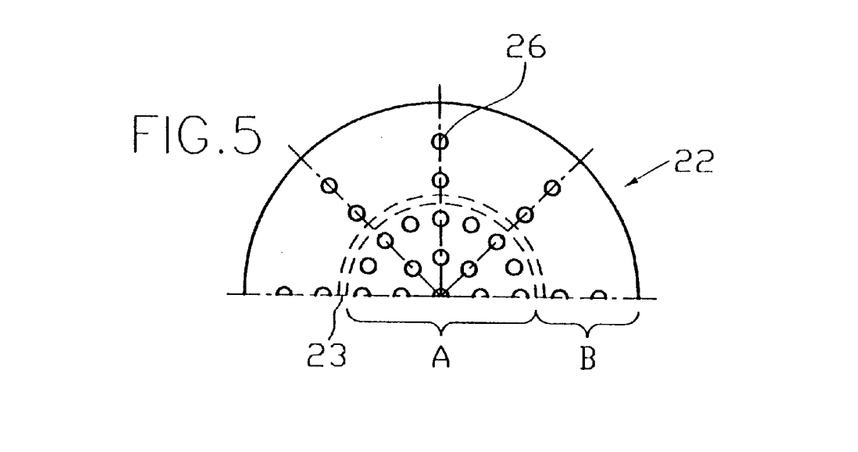
FIG. 5 is a top view on the distributing sieve according to FIGS. 2 to 4.

As becomes apparent from FIG. 5, substantially two areas A and B are provided on the water distributing sieve 22 with a different distribution of the sieve openings 126. The first area A comprises a great number of sieve openings 26 of equal size which are relatively closely adjacent to each other and distributed over the entire area A in a substantially uniform manner. In area B, the sieve openings 26 have the same diameter as in area A, but their number is considerably reduced and they are distributed at unequal distances—in the illustrated embodiment along eight radii—so that the open sieve surface per total surface is considerably smaller in area 6 than in area A, with the amount of water passing through area A being about 2 to 6 times, preferably 4 to 5 times, greater than the amount of water passing through area B. Areas A and 8 are separated from each other by a partition wall 23, with area A being supplied with hot water via the first chamber 24 and area B via the second chamber 25.

Area A (and consequently the first chamber 24 and the partition wall 23) is arranged such that in the mounted state of the lid 19 (in the closing position of FIGS. 2 to 4) area A is located above the place at which the tip of the heaped cone 16 of ground coffee is formed during use of the metering means. In the present embodiment, this place is the central section coaxial to the center line 13a.

Hence, the partition wall 23 is made circular and encloses a circular area A while area B annularly surrounds area A.

The operation of the coffee machine 1 shall now be described. In operating the operating means 12 the user selects the kind of coffee beverage, e.g. standard filter coffee or café creme or espresso, or the like, and also the amount to be brewed, i.e. a cup or cups, individual pots or a whole jug 11. For instance, when the brewing of filter coffee is preselected in an amount sufficient for filling the jug 11, the lid 19 is pivoted away from the brewing means 5, the plunger 14 is moved into the position shown in FIG. 2, the motor 9 is switched on and the metering screw 8 is rotated at the predetermined number of revolutions to heap a predetermined amount of ground filter coffee 16 into the brewing means 5, whereby the heaped cone shown in FIG. 2 is formed on the brewing strainer 15. The lid 19 is then closed and the necessary amount of hot brewing water is supplied to the brewing means 5 in a way that the heaped cone of ground coffee according to FIG. 2 is leveled off so that subsequently the ground coffee lies on the brewing strainer 15 with a layer of substantially uniform thickness as shown in FIG. 3. To this end the valve 7a is first closed and a first gush of brewing water is introduced into the chamber 24 solely via the line 6, whereby the brewing water is distributed over the cross-section of the brewing strainer 15 in a non-uniform manner, i.e. it impinges only on the tip of the heaped cone in a locally centrally concentrated manner, thereby flushing the ground coffee laterally away, so that the latter will be distributed in a uniform manner. Subsequently, the valve 7a is opened; the time lag between the opening of the two valves 6a and 7a can be empirically determined in advance and programmed accordingly so that water can now be applied to the entire surface of the ground coffee layer.

The leveling operation for the heaped cone may also be combined with a pre-infusion in which prior to the steeping process proper the ground coffee is first moistened, whereby the ground coffee is exploited in an improved manner. To this end the amount of water first applied to the tip of the heaped cone is chosen to be rather small so that although said amount will level off the heaped cone, it is first absorbed by the ground coffee. The subsequent second gush of water from the opened valves 6a and 7a will then bring about the steeping effect.

The size of the support surface for ground coffee 16, in this embodiment the size of the area of the brewing strainer 15, must be adapted for each coffee machine to the volume of the brewing batch to be brewed. Since a relatively great layer thickness will prolong the flow time of the water through the ground coffee, and thus the brewing time, to a more or less considerable extent, which is a serious drawback in particular in the case of commercial coffee machines, brewing strainers for large brewing batches would have to have a relatively large support surface for ground coffee, thereby enabling the ground coffee to form a reasonably thin layer on the brewing strainer 15. Brewing strainers 15 with a large area, however, are disadvantageous when smaller batches, for instance a cup or cups, are to be brewed with the aid of the same brewing means. The amount of ground coffee which is then smaller by necessity covers the brewing strainer 15 with the heaped cone only in part, as shown in FIG. 4. If brewing water was now metered in the standard amount, the major part of the brewing water would immediately pass through the edge portions of the brewing strainer 15 without previously contacting the ground coffee. Without the possibility offered by the invention, i.e. to level off the ground coffee in advance, either an uneconomically great amount of ground coffee per cup would have to be used, or the wish to produce brewing batches of greatly varying sizes per each brewing operation with the same brewing means would have to be abandoned.

Thanks to the possibility offered by the invention, i.e. to level off the ground coffee in advance by introducing water in a purposefully irregular manner and in locally concentrated form onto the expected tip of the heaped cone, the size of the brewing means can be chosen such that a much larger quantitative range can be covered per brewing operation. With the design shown in FIGS. 1 to 4, i.e. the possibility of feeding water to the two areas of the water distributing sieve in a purposeful manner, the leveled layer of a small amount of ground coffee need riot even cover the whole brewing strainer 15, since e.g. at small amounts of ground coffee it is only possible to supply water via the central area A, whereby the water is passed at any rate through the ground coffee, if not vertically, then horizontally, although it is flowing off through the uncovered edge portions of the brewing strainer 15.

The possibility of using smaller amounts of ground coffee is particularly expedient when espresso or cafe creme is also to be brewed with the brewing means 5. To make such beverages, the plunger 14 is pushed upwards after the ground coffee 16 has been leveled off by a first gush of water in the area A, which simultaneously serves the purpose of pre-infusion, and the ground coffee is pressed between the brewing strainer 15 and the water distributing sieve 22. Thanks to the uniform layer thickness of the ground coffee, the ground coffee is evenly compacted at the same time, whereby the brewing results are improved considerably. Depending on the amount respectively required, the brewing water may then be introduced either only via area A or via the combined areas A and B.

After the brewing process the steeped coffee grounds are pressed if such a pressing operation has not already been performed during the preparation of the coffee (espresso), the uniform ground-coffee layer being here also of advantage as it permits an optimum uniform pressing operation, resulting in the formation of a firmly cohering filter cake which, possibly after having been dried with the aid of air blown therethrough or with steam, can be ejected easily and substantially completely, i.e. without any residues, from the brewing means. The ejecting operation is carried out by wipers, or the like, with the lid being removed and the plunger 14 being pushed upwards up to the filling opening 13c.

Figure 6:
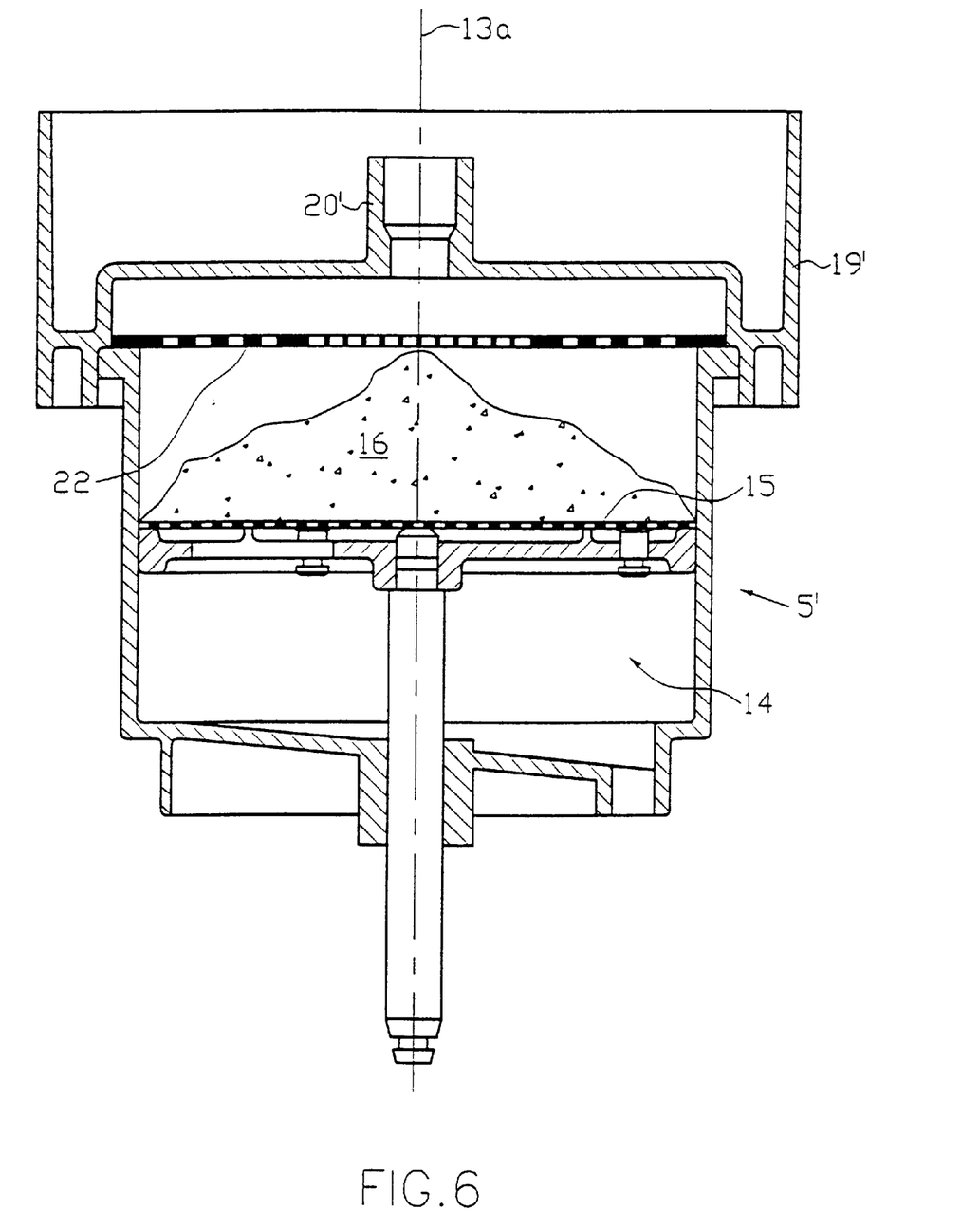
FIG. 6 shows a further embodiment of a brewing chamber.

The method of the invention, i.e. to level off a heaped cone of ground coffee by a suitable water guiding means, can also be employed in coffee machines the brewing means of which only comprises a single water supply line, as has so far been the case with coffee machines. FIG. 6 shows such a brewing means 5' which, except for the absence of a second water connection and the annular partition wall in the lid 19', is identical with the brewing means 5 of FIGS. 1 to 4 so that the means need not be explained once again. The sole water connection, i.e. water connection 20', terminates coaxially with the center line 13a in the lid 19' so that the introduced water is distributed over the whole area of the water distributing sieve 22. Nevertheless, on account of the larger open sieve surface of the water distributing sieve 22 in area A, as compared with area B (see FIG. 5), the gush of water is concentrated in the center and on the tip of the heaped cone of ground coffee 16, the area A again passing 2 to 6 times, preferably 4 to 5 times, more water per time unit than the area B, so that even without a second water connection the ground coffee can efficiently be leveled off to obtain a layer having a substantially uniform thickness. In this embodiment the water distributing sieve 22 may replace the conventional water distributing sieves with a uniform distribution of the free sieve surface and uniformly large flow openings, so that coffee machines already in use can be retrofitted in an easy manner.

Figure 7:
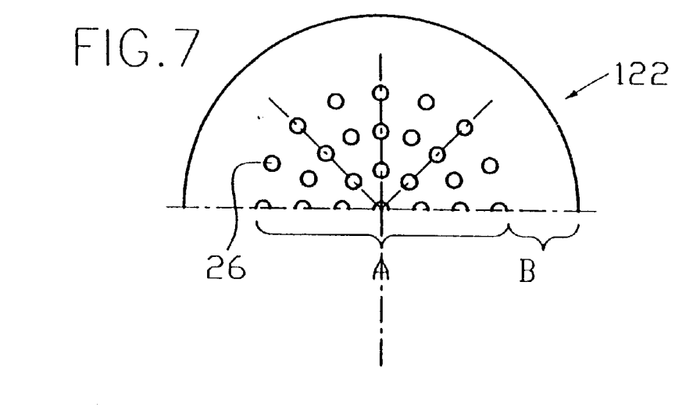
FIG. 7 shows a further embodiment of a distributing sieve.

The water guiding effect of a water distributing sieve designed in accordance with the invention can be exactly customized to the desired and intended use. For instance, FIG. 7 shows a modified embodiment of a distributing sieve 122 which has turned out to be particularly efficient. In said distributing sieve only the central area A is provided with flow openings 26. The flow openings 26 in area A have the same flow cross-section and are uniformly distributed in area A while the edge portion B which is annularly surrounding the area A has no flow openings so that the water can be purposefully applied by means of said water distributing sieve 11 to the center only where it spreads the heaped cone by way of flushing.

Figure 8:
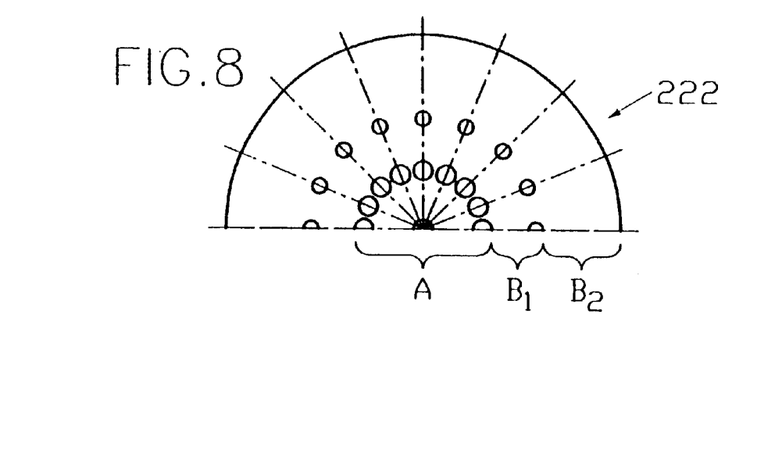
FIG. 8 shows a further embodiment of a distributing sieve.

A further development of a water distributing sieve 222 designed in accordance with the invention is shown in FIG. 8. The water distributing sieve 222 is predominantly subdivided into three areas, with the first central area A having the largest open sieve surface, which is however formed by irregularly distributed flow openings 26 which are arranged in the form of a ring concentrically located around a flow opening positioned in the center line 13a. The area A is surrounded by a first annular area B, which consists of a single ring of flow openings 26; although the number of said flow openings 26 corresponds to the number of flow openings in the ring of area A, said openings yield a smaller open sieve surface per surface of the area B1 because of the greater radial distance of area B1. Area B1 is surrounded by a further annular area B2 which is devoid of any flow openings.

Figure 9:
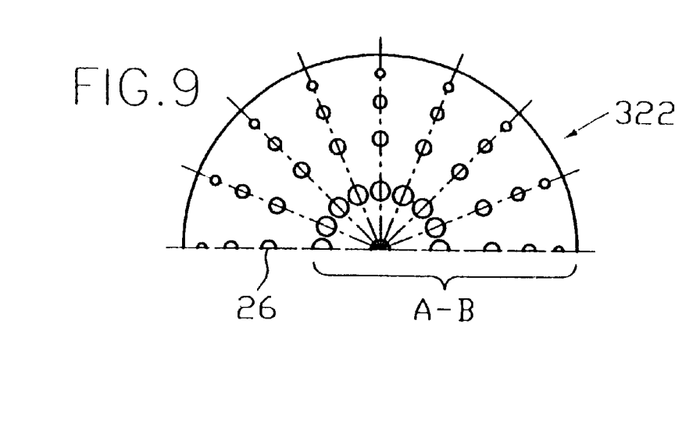
FIG. 9 shows a further embodiment of a distributing sieve.

FIG. 9 shows a further variant of a water distributing sieve 122 in the case of which areas A and B gradually pass into each other, with the flow openings 26 being again arranged in concentric rings with the same number of flow openings in each ring. In the present embodiment, however, the flow openings have different sizes, the largest being in the center while gradually decreasing towards the edge of the water distributing sieve 322.

Further variants are possible. For instance, an expedient shape of the flow openings and/or an expedient control of the valves 6a and 7a may have the effect that the water passes through the water distributing sieve at a purposefully different pressure, with the area of the maximum water pressure being of course arranged at the place where the tip of the heaped cone is expected.

Furthermore, with the development shown in FIGS. 2 to 4, i.e. two differently controllable water supply lines, it may be sufficient if use is made of one distributing sieve having the standard uniform distribution of the flow openings, but special attention must in this case be paid to the control of the two shut-off valves 6a and 7a to ensure the desired and purposefully non-uniform supply of water.

Furthermore, the invention is not limited to the embodiments of a coffee machine as described and illustrated. The measures taken according to the invention for guiding the water are also possible in brewing means of different constructions, e.g. in brewing means. Operating without plungers or in brewing means comprising annular brewing strainers or brewing strainers with a shape differing from that of a circle. Finally, the water guiding means according to the invention may be combined with further measures additionally supporting the leveling off of the ground coffee, e.g. a filling means for ground coffee which is movable over the cross section of the support surface, a baffle arranged in the metering sieve for the ground coffee, such as a guiding cone or the like, a movable wiper, or a vibration generator or vibrator. Accordingly, the invention is not limited, except as by the appended claims.

What is claimed is:

1. A coffee machine comprising a coffee metering means, a brewing means having an essentially cylindrical housing and a support surface for receiving ground coffee transferred by the metering means into the brewing means and a means for applying water onto the ground coffee, characterized by a leveling means for purposefully guiding the water over the ground coffee in a non-uniform manner such that the ground coffee is distributed over the support surface in a layer having substantially uniform thickness, the leveling means contains a sieve arranged opposite to the support surface and comprising flow openings which have different sizes and/or are distributed in a non-uniform manner for producing a flow varying over the sieve, so that the open sieve surface formed by the sum of the flow cross-section of the flow opening is greater per unit area in a first central area of the sieve than in a second outer area of the sieve.

2. The coffee machine according to claim 1, wherein the leveling means comprise a plurality of supply means for applying the water in a plurality of stream onto the ground coffee.

3. The coffee machine according to claim 1, wherein the leveling means contains a sieve and first and second supply means for water, said first supply means communicating with a first area of the sieve and the second supply means communication with a second area of the sieve, and that the supply means are connected to shut-off means permit the selective supply of water to the first and/or the second area of the sieve.

4. The coffee machine according to claim 1, wherein the water flow can be concentrated by the leveling means onto the center of the support surface of the ground coffee.

5. The coffee machine according to claim 1, wherein water can be applied by the leveling means to the ground coffee to be distributed over the support surface in a quantitatively non-uniform manner.

6. The coffee machine according to claim 1, wherein water can be applied by the leveling means to the ground coffee at a pressure varying over the support surface.

7. The coffee machine according to claim 1, wherein the diameter of a flow opening in an area of the sieve is greater than the diameter of a flow opening in a second area of the sieve.

8. The coffee machine according to claim 1, wherein the flow openings in a first area of the sieve are concentrated and a further area is without any flow openings.

9. The coffee machine comprising a coffee metering means, a brewing means having an essentially cylindrical housing and a support surface for receiving ground coffee transferred by the metering means into the brewing means and a means for applying water onto the ground coffee, characterized by a leveling means for purposefully guiding the water over the ground coffee in a non-uniform manner such that the ground coffee is distributed over the support surface in a layer having a substantially uniform thickness, the leveling means contains a sieve having flow openings, and the leveling means contains first and second supply means for water, said first supply means communicating with a first central area of the sieve and the second supply means communicating with a second outer area of the sieve, and that the supply means are connected to shut-off means which permit the selective supply of water to the first and/or second area of the sieve.

10. The coffee machine according to claim 9, wherein the sieve arranged opposite to the support surface comprises flow openings which have different sizes and/or distributed in a non-uniform manner for producing a flow varying over the sieve.

11. The coffee machine according to claim 10, wherein the open sieve surface formed by the sum of the flow cross-section of the flow opening is greater per unit area in a first area of the sieve than in a second area of the sieve.

12. A method for opening a coffee machine, said coffee machine comprising a brewing means having a substantially cylindrical housing and a support surface positioned within the housing for receiving ground coffee, comprising:

introducing ground coffee into the housing, thereby forming a heaped cone having a peak of ground coffee supported by the support surface;

providing a flow of water into the housing;

initially concentrating the flow of the water on the peak of the heaped cone, and distributing the coffee by the concentrated flow of water to form a layer of ground coffee having a substantially uniform thickness.

13. The method according to claim 12 further including a second flow of water over the distributed coffee for brewing the coffee.

* * * * *

UNITED STATES PATENT AND TRADEMARK OFFICE
CERTIFICATE OF CORRECTION

PATENT NO. : 6,513,419 B2
DATED : February 4, 2003
INVENTOR(S) : Siegfried Huber et al.

It is certified that error appears in the above-identified patent and that said Letters Patent is hereby corrected as shown below:

<u>Title page,</u>
Item [57], ABSTRACT,
Lines 2, 3 and 8, "member" should read -- means --.

<u>Column 7,</u>
Line 61, "cross-section" should read -- cross-section --.
Line 66, "stream" should read -- streams --.

<u>Column 8,</u>
Line 5, "communication" should read -- communicating --.
Line 39, "and/or" should read -- and/or the --.
Line 43, ""and/or" should read -- and/or are --.
Line 48, "section" should read -- sections --.
Line 50, "opening" should read -- operating --.

Signed and Sealed this

Nineteenth Day of August, 2003

JAMES E. ROGAN
*Director of the United States Patent and Trademark Office*